United States Patent [19]

Arlandis

[11] Patent Number: 5,734,570
[45] Date of Patent: Mar. 31, 1998

[54] WHEELED VEHICLE STEERING SYSTEM FOR STEERING THE REAR WHEELS OF A VEHICLE

[75] Inventor: Thierry Hubert Arlandis, Norwich, United Kingdom

[73] Assignee: Lotus Cars Limited, Norfolk, United Kingdom

[21] Appl. No.: 669,850

[22] Filed: Jun. 26, 1996

Related U.S. Application Data

[63] Continuation of Ser. No. 290,879, filed as PCT/GB93/01643, Aug. 4, 1993, published as WO94/03354, Feb. 17, 1994, abandoned.

[30] Foreign Application Priority Data

Aug. 4, 1992 [GB] United Kingdom ............... 92165447

[51] Int. Cl.$^6$ ...................................... G06G 7/76
[52] U.S. Cl. ............ 364/424.052; 364/424.05; 364/424.053; 364/424.045; 364/424; 364/426.03; 180/197; 180/415; 180/412; 180/79.1; 180/132; 180/140; 180/143; 303/147
[58] Field of Search ............ 364/424.05, 424.01, 364/425.01, 426.03, 565, 571.01, 424.051, 424.052, 424.053, 424.045, 423.098; 395/905; 180/197, 412, 446, 410, 415, 407, 41, 421, 422; 280/707, 840, 772, 91.1; 477/108, 903; 303/147, 146

[56] References Cited

U.S. PATENT DOCUMENTS

| | | | |
|---|---|---|---|
| 4,666,013 | 5/1987 | Shibahata et al. | 180/141 |
| 4,767,588 | 8/1988 | Ito | 364/424 |
| 4,803,627 | 2/1989 | Yasuika | 364/424.05 |
| 4,828,061 | 5/1989 | Kimbrough et al. | 180/79.1 |
| 4,840,389 | 6/1989 | Kawabe et al. | 364/424.05 |
| 4,842,089 | 6/1989 | Kimbrough et al. | 180/79.1 |
| 4,878,557 | 11/1989 | Shibahata et al. | 180/140 |
| 4,947,327 | 8/1990 | Kawagoe | 364/424.05 |
| 5,001,637 | 3/1991 | Shiraishi et al. | 364/424.05 |
| 5,267,160 | 11/1993 | Ito et al. | 364/424.05 |
| 5,273,129 | 12/1993 | Wright et al. | 180/132 |
| 5,274,576 | 12/1993 | Williams | 364/424.05 |
| 5,297,045 | 3/1994 | Williams et al. | 364/424.05 |
| 5,348,111 | 9/1994 | Williams et al. | 180/140 |
| 5,388,658 | 2/1995 | Ando et al. | 180/197 |
| 5,402,341 | 3/1995 | Liubakka et al. | 364/424.05 |
| 5,467,278 | 11/1995 | Sugiyama | 364/424.05 |

FOREIGN PATENT DOCUMENTS

| | | |
|---|---|---|
| A-62-137275 | 6/1987 | Japan . |
| A-02095985 | 6/1990 | Japan . |
| A-3804587 | 8/1989 | WIPO . |
| A-0346178 | 12/1989 | WIPO . |
| A-9014980 | 12/1990 | WIPO . |
| A-0467413 | 1/1992 | WIPO . |

*Primary Examiner*—Jacques Louis-Jacques
*Attorney, Agent, or Firm*—Westman, Champlin & Kelly, P.A.

[57] ABSTRACT

The present invention relates to a steering system for the rear wheels (13,14) of a vehicle comprising an actuator (18) for steering the rear wheels (13,14), sensor unit for measuring vehicular parameters (e.g. a vehicle speed sensor (20), an accelerometer (21) and a steer angle sensor (23)) and generating signals indicative thereof, and a control system for controlling the actuator (18) comprising a processor (17) which processes the signals generated by the sensor unit (20,21,23) and controls the rear wheels (13,14) accordingly. The control system of the invention has detection unit to detect when the signals generated by the sensor unit (20,21, 23) indicate that the vehicle is sliding and override unit which modifies the operation of the control system when sliding is detected.

10 Claims, 3 Drawing Sheets

WHEELED VEHICLE STEERING SYSTEM FOR STEERING THE REAR WHEELS OF A VEHICLE

This is a continuation of application Ser. No. 08/290,879, filed as PCT/GB93/01643 Aug. 4, 1993, published as WO94/03354 Feb. 17, 1994, now abandoned.

The present invention relates to a steering system for the rear wheels of a wheeled vehicle having front and rear wheels.

"Four wheel" steer has been known previously and one such system is described in the patent specification of International publication No. WO 90/14980 of the applicant, which will be extensively referred to hereinafter.

The steering system of WO 90/14980 uses a processor to compare desired steering (as sensed by a sensor connected directly or indirectly to a steering wheel) with the actual steering of the vehicle (determined using a yaw gyrometer or lateral accelerometer). The steer angle of the rear wheels is controlled as a function of the error between the desired and actual vehicle turning.

The system described in WO 90/14980 has been found not to cope well with oversteer slide conditions. In a normal vehicle when a vehicle starts to slide due to oversteer, the driver can apply "reverse lock" (i.e. steering in the opposite sense to the sense of the steering on commencement of the slide) to correct the slide. It has been found that the closed loop steering system previously described in WO 90/14980 produces undesirable effects in an oversteer slide when "reverse lock" is applied.

During an oversteer slide the rear tires lose considerable grip and it is difficult to generate correcting forces during the slide by using the rear wheels. This situation changes dramatically at the end of the slide, when the rear wheels regain full grip. With the high bandwidth control system of WO 90/14980 the rear wheels move rapidly to full lock when the "reverse lock" is applied to the steering wheel by the driver. Therefore the wheels are in an undesirable position on recovery. Furthermore, as the rear reverse lock is taken off by the driver, the rear wheels tend to move from one lock to the other quickly. This action of the rear wheels during the oversteer condition and return to normal conditions leads to unstable and undesired vehicle motion.

The Patent Abstract of Japan to JP-A-62137275 describes a steering system for the rear wheels of a vehicle which comprises: an actuator for steering the rear wheels; sensor means for sensing the lateral speed of the vehicle, the longitudinal speed of the vehicle and a front wheel steering angle; a control system for controlling a ratio of rear wheel steering angle to front wheel steering angle which comprises a processor which processes the signals generated by the sensor means and controls the steering ratio accordingly. The control system detects reverse handling of the vehicle by calculating a body slip angle from the lateral car speed signal and the longitudinal car speed signal and compares the sense of the body slip angle with the sense of the front wheel steering angle and the control system to conclude that there is reverse handling when the calculated car body slip angle is opposite in sense to the front wheel steering angle and the sum of the absolute values of the car body slip angle and the front wheel steering angle exceeds a given value. When reverse handling is detected the controlled steering ratio is varied to zero or is varied such that front and rear wheels all steer in the same direction.

The present invention provides a steering system for the rear wheels of a vehicle comprising:

an actuator for steering the rear wheels, sensor means for measuring vehicle parameters and generating signals indicative thereof, and a control system for controlling the actuator to steer the rear wheels comprising a processor which processes the signals generated by the sensor means and controls the rear wheels accordingly;

wherein the control system has detection means to detect when the signals generated by sensor means indicate that the vehicle is sliding and override means which modifies the operation of the control system when sliding is detected and wherein the sensor means measures the displacement of a manually operable steering element of the vehicle characterised in that, the sensor means measures the yaw rate of the vehicle; the processor means determines a desired yaw rate as a function of the measured steering element displacement and the control system comprises a closed yaw rate error control loop feedback system for controlling the steer angle of the rear wheels as a function of the error between the measured yaw rate and the desired yaw rate, the override means altering a gain in the yaw rate error control loop when sliding is detected.

Thus the steering system has means to detect slide and acts to improve the performance of a rear wheel steer vehicle in a slide situation.

The variation of gain is an easy and effective operation to arrange. The reduction of feedback gain also increases the stability of the closed loop system.

In preferred embodiments of the invention the detection means is adapted to detect oversteer slide.

Preferably the sensor means measures vehicle velocity and the detection means compares the measured velocity with a preprogrammed velocity threshold, the override means only modifying the operation of the control system when detection means detects that the measured velocity exceeds the velocity threshold.

This ensures that the operation of the control system is not modified during parking and other low velocity maneuvers.

Preferably the sensor means measures the lateral acceleration of the vehicle and the detection means compares the measured lateral acceleration with a preprogrammed lateral acceleration threshold, the override means only modifying the operation of the control system when the detection means detects that the measured lateral acceleration exceeds the lateral acceleration threshold.

This again ensures that unwanted modification of the operation of the control system at low speeds is avoided.

Preferably the detection means includes a low pass filter by which the measured lateral acceleration signal is filtered before it is compared with the lateral acceleration threshold.

This ensures that modification does not occur if lateral acceleration is only momentarily greater than the threshold.

Preferably the sensor means measures the steer angle of the front wheels of the vehicle, the yaw rate of the vehicle and the lateral acceleration of the vehicle and the detection means combines the signals indicative of yaw rate, steer angle and lateral acceleration according to a preprogrammed algorithm to generate a variable which is compared with a preprogrammed value, the override means only modifying the operation of the control system when the detection means detects that the variable exceeds the preprogrammed value. This will be described in great detail later.

Preferably the sensor means measures the steer angle of the front wheels of the vehicle and the lateral acceleration of the vehicle, the detection means monitoring whether the steer angle and the lateral acceleration are in the same sense and the override means modifying the operation of the control system only when the detection means detects that the steer angle and the lateral acceleration are of opposite sense.

Thus an "opposite lock" is detected.

Preferably the override means reduces a gain of the control system from a first level to a second level when the sliding is detected and increases the gain from the second level to the first level when the detection means detects from the signals generated by the sensor means that the sliding of the vehicle has stopped, the override means ramping the gain between the first and second levels at preprogrammed rates.

This ensures a smooth transition between gains.

The override means preferably ramps the gain from the first level to the lower second level at a rate which is faster than the rate at which it ramps the gain from the second level to the first level.

It is advantageous to quickly alter the performance of the control system as the vehicle enters the slide, when the rear wheels lose traction. It is advantageous to more slowly alter the control system at the end of a slide to prevent instability as the rear wheel regains traction.

In a preferred embodiment the sensor means measures lateral acceleration and the detection means compares the lateral acceleration with a preprogrammed lateral acceleration threshold, the override means increasing the rate at which it ramps the gain of the control system from the second level to the first level when the detection means detects that the measured lateral acceleration is less than the preprogrammed lateral acceleration threshold.

The override means can make further allowances for slide conditions by introducing a phase lead or a phase lag in the yaw error control loop.

A preferred embodiment of the present invention will now be described with reference to the accompanying drawings in which.

Figure 1:
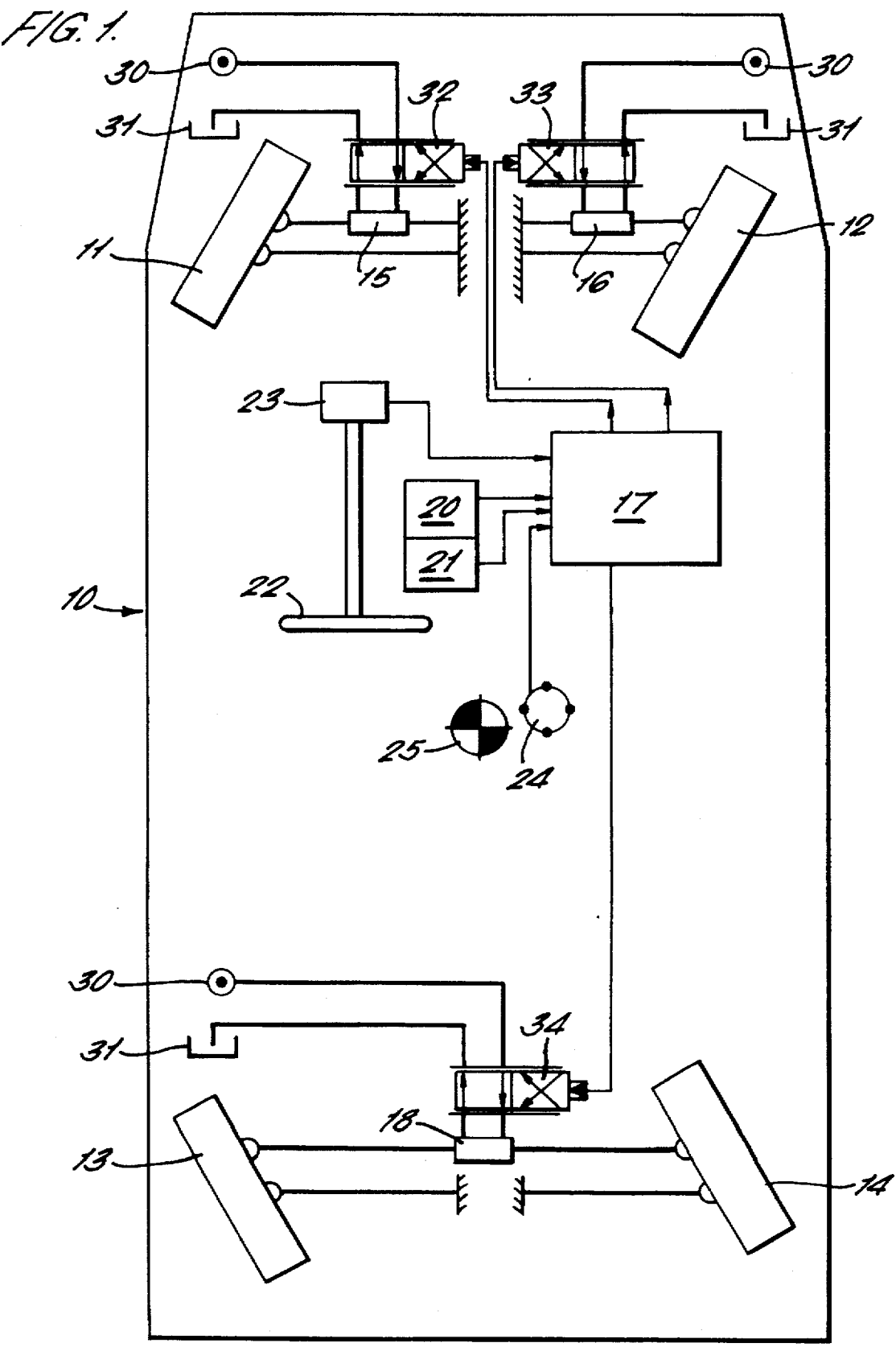
FIG. 1 is a schematic representation of a vehicle with a rear steer system.

The vehicle steering control system has already been described in WO 90/14980, but will be recapped with reference to FIG. 1 in which a vehicle 10 has front wheels 11 and 12 and rear wheels 13 and 14. The front wheels 11 and 12 are respectively steered by actuators 15 and 16 which are controlled by a digital processor 17. The rear wheels 13 and 14 are steered by one actuator 18, again controlled by digital processor 17.

A vehicle speed sensor 20 is provided and its output is supplied to the digital processor 17. The vehicle speed sensor 20 is in the preferred embodiment an optical sensor.

An accelerometer 21 is provided to measure the lateral acceleration Ny of the vehicle. The output of the accelerometer 21 is supplied to the digital processor 17. A manually controlled steering element in the form of a steering wheel 22 is provided and a sensor 23 is connected to the steering wheel to measure the angle of turning of the wheel 22. The output of the sensor 23 is supplied to digital processor 17.

A yaw gyrometer 24 is mounted in the vehicle as near as possible to the centre of gravity 25 of the vehicle. The yaw gyrometer 24 generates a signal indicative of the yaw rate R of the vehicle, which is sent to the controller 17.

The actuators 17, 16 and 18 are all of a known type comprising double acting hydraulic actuators containing a piston. One side of the piston is connected to the tie rod of a vehicle wheel through an aperture in the cylinder end wall. The actuators are controlled by the control of hydraulic fluid to the sides of the piston from a suitable source of hydraulic pressure (e.g. a pump 30) and to a suitable exhaust for fluid (e.g. a reservoir of fluid 31 for a pump).

The digital processor 17 controls servo-valves 32,33 and 34 to control the actuators 15, 16 and 18. It controls the servo-valves using electrical signals and thereby controls the fluid flow to the actuators.

A desired steer angle of is measured by the sensor 23. A signal indicative of measured steering angle $\beta f$ is supplied to the control processor 17. The digital processor 17 controls the steering angle of the front wheels to $\beta f$ using an open loop control system.

The control processor 17 controls the rear wheels 13 and 14 of the vehicle using a closed loop system which uses a steer error calculated by the processor 17 which is calculated as the difference between the desired yaw rate of the vehicle (calculated as a function of desired steer angle $\beta f$) and the measured yaw rate R of the vehicle as measured by yaw gyrometer 25.

Figure 2:
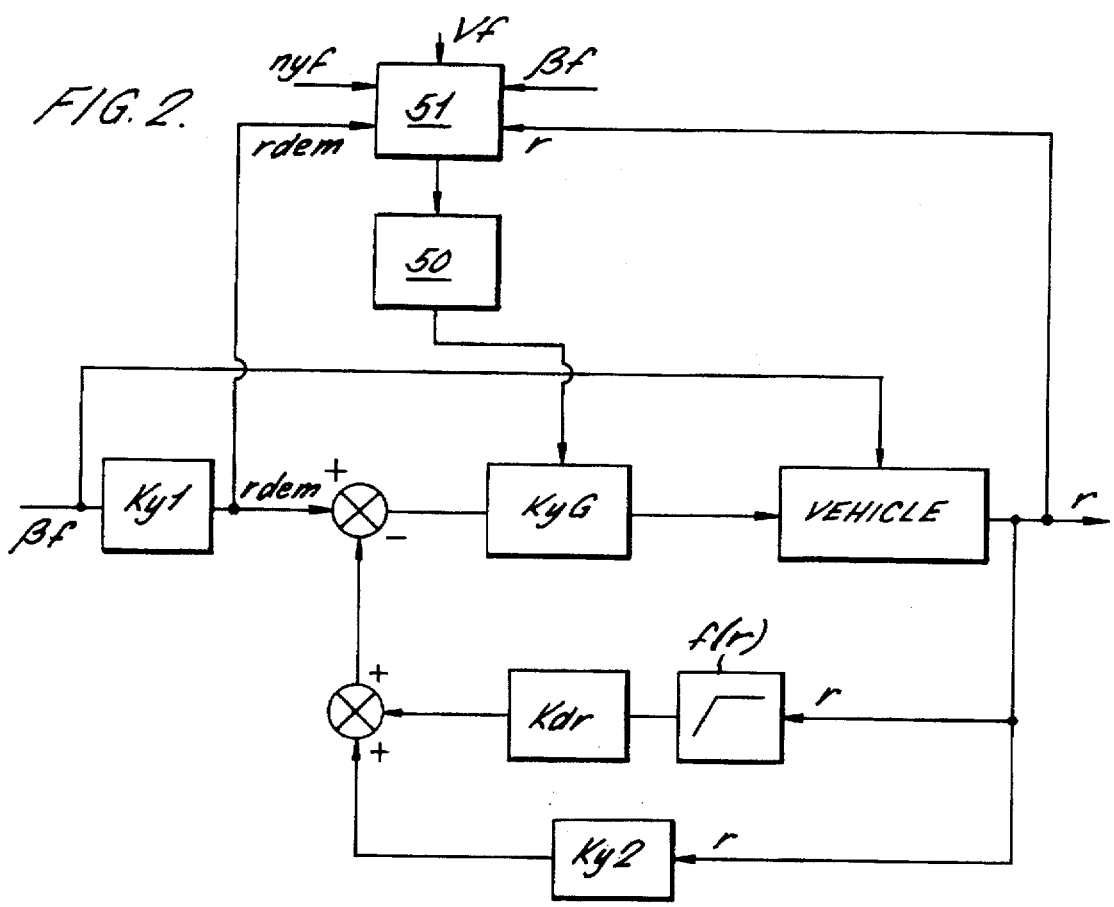
FIG. 2 illustrates a control system for operating the rear steer control unit of the invention.

FIG. 2 shows a block diagram of the closed loop control system controlling the rear actuators, the algorithm for which is as follows:

$$\beta r = KyG*(\beta f*Ky1 - R*(Ky2 + Kdr + f(r)))$$

where $\beta r$=Rear wheel steer angle

Kyg=Loop gain

Ky1=Gain of chosen value

R=Yaw rate of the vehicle

Ky2=Gain of chosen value

Kdr=Gain of chosen value f(r)=Differentiator

Figure 3:
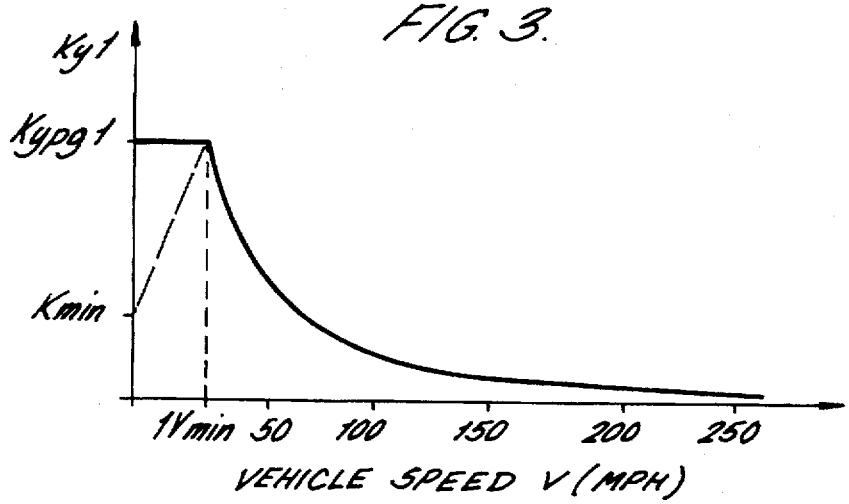
FIG. 3 shows graphically how the gain of the closed loop control system for controlling the rear wheels varies with vehicle velocity.

The demanded steer angle $\beta D$ becomes a yaw rate demand rdem by the gain Ky1. The gain Ky1 is varied with vehicle speed in a relationship which is illustrated in FIG. 3.

The yaw rate sensor 20 provides the measure of yaw rate r which is used in the feedback system. The use of yaw acceleration feedback link provided by the differentiator f(r) and the gain KDr has been found to improve the stability of the system.

Other ways of controlling the rear steer angle $\beta R$ of the vehicle are possible and these have previously been described in WO 90/14890 and will not be elaborated here.

In the present invention the control of the vehicle has been improved by modifying the control system to cope with oversteer slide conditions. In the preferred embodiment described in detail herein the improvement is achieved by override means 50 which reduces loop gain KyG when certain conditions are met. This induces a reduction of the rear steer angle $\beta r$ and therefore reduces the difference in angle between the oversteer position of the rear wheels and the steer angle of the rear wheels in the normal cornering conditions. The override means 50 which is part of the processor 17 does this by switching between two preprogrammed values of gain.

The processor 17 has detection means 51 which uses the following three tests to determine whether an oversteer condition exists in which the gain KyG must be altered:

1. The control processor checks whether:

$$ABS(Vf) > VmynL$$

ABS(Vf) is the absolute value of a filtered measured velocity of a vehicle. The low pass filtered speed must be above a minimum value before any switching of the gain KyG can occur. This ensures that no switching of the gain occurs at parking speeds. The Vf signal is obtained by passing a measured velocity signal V through a low pass filter which averages its value.

2. The detection means 17 checks whether an absolute value of low pass filtered lateral acceleration is above a given threshold:

$$ABS(nyf) > NyLim$$

This is done for the same reason as (1), to avoid unwanted switching of the gain KyG.

3. The detection means 51 checks whether the sign of the filtered lateral acceleration ny and the sign of the filtered steer angle βf are opposite in sense. This makes certain that the vehicle is in "opposite lock" condition.

All three tests listed above must be met at the same time before KyG is switched. If one of them is not satisfied then the system will revert to or remain in its normal settings. The detection means 51 controls the override means 50 by a suitable control signal.

When the vehicle enters oversteer slide conditions from normal conditions, the three above tests of the detection means are satisfied and it causes the override means 50 to switch the gain KyG from value KyG1 (used in normal conditions) to KyG2 (for limit handling conditions). Once the oversteer slide condition ceases then one or more of the above three tests will not be satisfied and the override means 50 switches gain KyG back from KyG2 to KyG1. A move from one value to the other is done with a time based linear interpollation. The time needed for the transient between the two values can be set at different values for each direction, ie. going from KyG1 to KyG2 or back from KyG2 to KyG1.

The override means 50 and detection means 51 are both part of processor 17 which is a digital processor operating at a specified clock frequency. An iteration counter in the processor 17 maintains a count itCnt which is used by the override means 50 to calculate two linear interpollation coefficients Trans1 and Trans2 for the different directions of switching between KpG1 and KpG2.

When the detection means 51 detects oversteer conditions and instructs the override means 50 to switch KyG from KyG1 to KyG2 then a time TmGo1 (preprogrammed into the override means 50) is used for the transition. TmGO1 is a number of iterations at 200 Hz, ie. TmGo1*5 is the number of milliseconds needed. Obviously TMGo1 is only the number of iterations at 200 Hz in the preferred embodiment and would be different if the processor 17 was running slower or faster. TmGo1 in the preferred embodiment system must be a power of two smaller than 32768. A variable TmGo2 is then calculated as follows:

$$TmGo2 = 32768/TmGo1$$

Two linear interpollation coefficients Trans1 and Trans2 are then calculated by the override means 50 as follows:

$$Trans2 = TmGo2 * ItCnt/32768$$

$$Trans1 = 32768 - Trans2$$

The gain KyG is then varied as follows:

$$KyG = (Trans1 * KyG1 + Trans2 * KyG2)/32768$$

If the vehicle is returning from oversteer conditions to normal operating conditions then the two linear interpollation co-efficients TmGo1 and TmGo2 are replaced in the override means 50 by TmRet1 and TmRet2 which give a longer transient period for return to normal operating conditions from the transient period from normal operating conditions to limit handling conditions.

Since the transient period lasts more than one iteration of the processor 17, it is possible that the oversteer conditions which start the switch from KpG1, to KpG2 cease before the switch to KpG2 is completed. Therefore, it must be possible to return to normal operating conditions before the switch to KyG2 is complete.

A variable TmMin is kept in memory by the override means 50 to set a minimum number of iterations (at 200 Hz) before the process of change between variables KyG1 and KyG2 can be reversed. Obviously TmMin will vary in value for processors operating at different speeds.

If TmGo1 or TmRet1 are of values above TmMin a reversal of the direction of change will occur as follows.

If a reverse is needed then Trans 1 is swopped with Trans2 and itCnt is given the value which it would have at point of switch over in the other direction, which is done as follows:

$$TmRat = TmRet1/TmGo1 \quad (NB \; TmRet1 > TmGo1 \; by \; choice)$$

During a transition from KyG1 to KyG2, when a return to KyG1 is required:

$$itCnt = TmRet1 - itCnt * TmRat$$

During a transition from KyG2 to KyG1, when a return to KyG2 is required:

$$itCnt = TmGo1 - itCnt/TmRat$$

TmRat is a constant for a particular embodiment.

Figure 4:
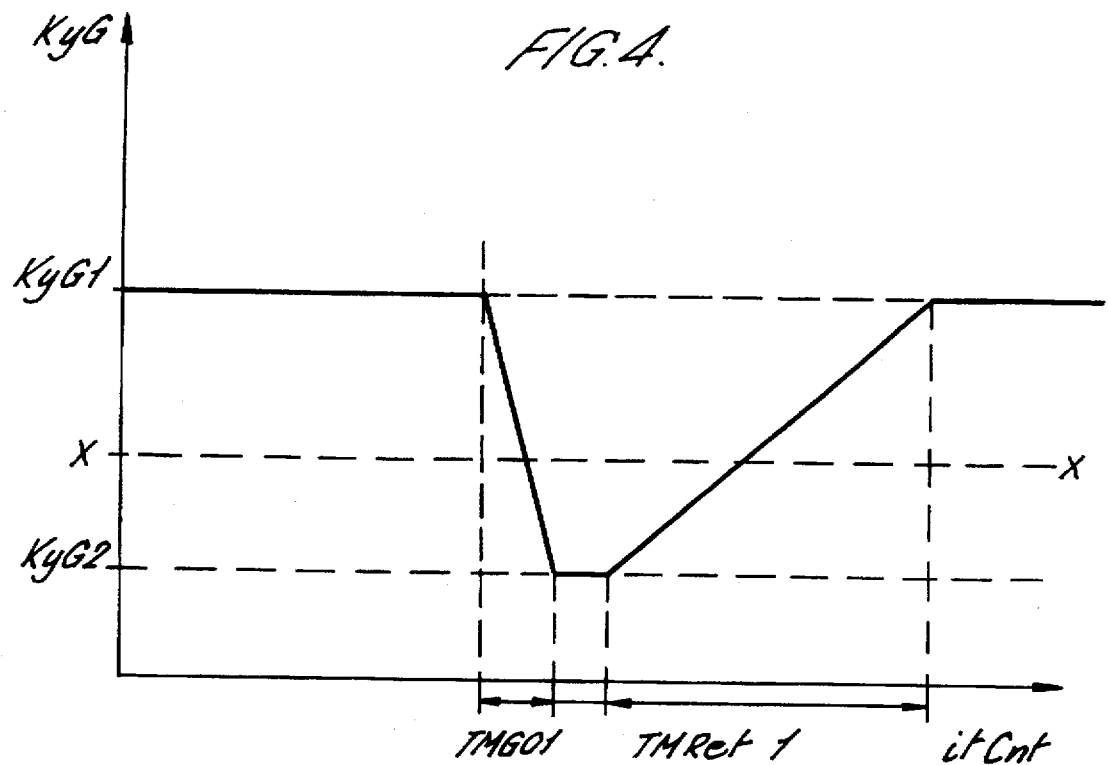
FIG. 4 shows graphically a transition of the desired loop gain of the rear steer system between its value for normal operating conditions and its value in oversteer slide conditions.

The graphic illustration of FIG. 4 shows a complete change between KyG1 and KyG2. It will be noted that the change from KyG1 to KyG2 is quicker than the change from KyG2 to KyG1. This is desirable since it is preferable to have the rear wheels move as quickly as possible in an oversteer condition, to allow rear wheel slide, whilst slower motion of the rear wheels is preferable at the end of the oversteer situation, so that the vehicle does not twitch automatically as the wheels return to normal operating conditions.

FIG. 4 shows a situation where KyG is varied from KyG1 to KyG2 and then immediately returned from KyG2 to KyG1. The dotted line X—X in the figure shows that for a given value of KyG, there are two values of itCnt, either in the transition from KyG1 to KyG2 or be returned from KyG2 to KyG1.

On a reverse of direction of change during a transition, the value of itCnt is switched between the two values it has for points on the diagram giving the same value of KyG.

Typically, TmGo1 will be chosen at 128 counts (ie. short) whilst TmRet1 will be chosen as 512 (ie. long).

Whilst it is preferable for the change from normal operating conditions of the rear steer wheels to the oversteer conditions to be faster than the reverse, the long period normally set for the change back to normal operating conditions can lead to a problem since the gain KyG might not be back to its original maximum value early enough after the end of the rear steer slide (it can take between 5 milliseconds and 163 seconds for the return). Thus, the car might not have the same response when the driver needs it in normal conditions.

To cure this override problem a further variable AccRat is calculated by the means 50. When the vehicle is in a transient period between KyG2 and KyG1, the value of KyLf is iteratively checked by the detection means 51 against a set value TrigAcc and the return to original operating conditions controlled by override means 50 is accelerated if the KpLf signal is less than TrigAcc. This check is carried out by the detection means 51.

The system is thus provided with two different return times: TmAcc1 for accelerated return to normal operating conditions and TmNorm1 for normal return to corresponding conditions. These values are used in place of TmRet1 in the override means 51, suitable TmAcc2 and TmNorm2 values being calculated from TmAcc1 and TmNorm1 in the same way that the value TmRet2 is calculated from TmRet1.

The variable AccRat is calculated by the override means 51 as follows:

$$AccRat = TmNorm\ 1/TmAcc\ 1$$

and if the detection means 51 senses that KyLf is less than TrigAcc then itCnt is calculated by the override means 50 as follows:

$$itCnt = itCnt/AccRat$$

Figure 5:
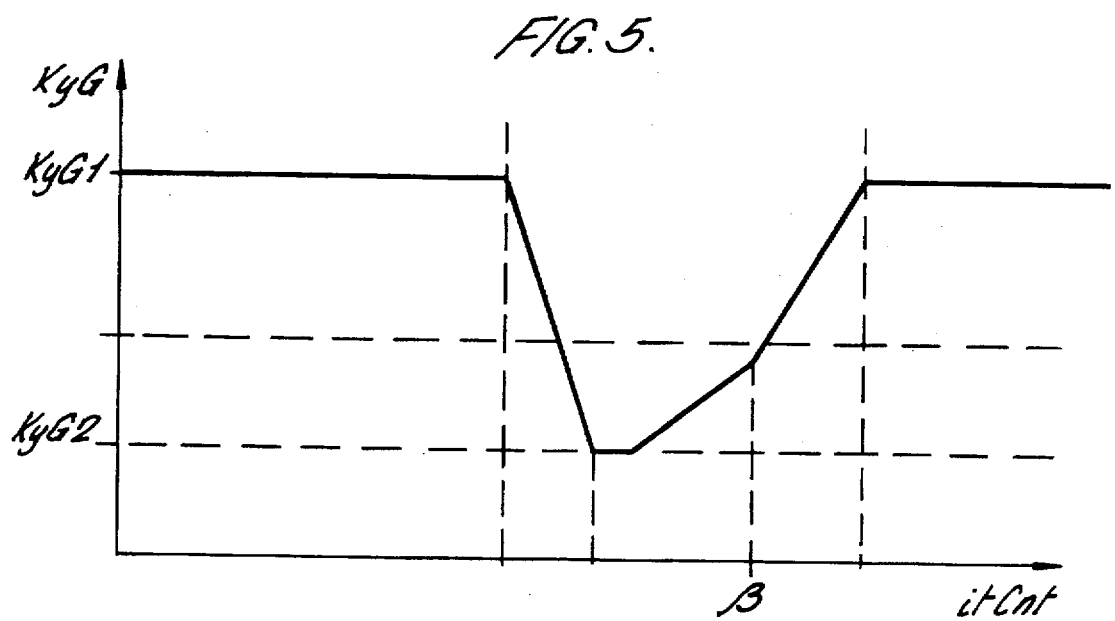
FIG. 5 shows graphically how a return to a value of closed loop gain for normal conditions can be accelerated.

The swop between a normal return time and an accelerated return time is illustrated in FIG. 5 the swop occuring at $itCnt = \beta$ It should be appreciated that the provision of an accelerated return time is not an essential feature of the invention. It should also be appreciated that the specific details of the closed loop control system for the rear wheels described in the specification should not be considered as essential. The closed loop system could for instance use lateral acceleration, rather than yaw rate to compare actual vehicle response with desired vehicle response.

Whilst in the preferred embodiment the gain of the control loop is varied the system could also work by changing the demand signal to the rear wheels. For instance the applicant envisages a system in which the yaw rate demand rdem calculated from the demanded steer angle βf is calculated by a function which is altered when slide conditions are sensed. For instance the gain Ky1 could be ramped between a normal operating value and a value for slide conditions in a similar fashion to the gain KyG.

It is also possible to use a fourth test, in addition to the three tests used above, to determine whether an oversteer condition exists. For the fourth test the detection means 17 calculates a variable KyL called the "limit handling demand". The "limit handling demand" is calculated as a function of either measured yaw rate or lateral acceleration.

Using yaw rate in the calculation a "steady state" demand Ky21 is calculated as follows:

$$Ky21 = UndstG1*rdem + UndStG2*r$$

where

Ky21="Steady state demand"

UndstG1=Chosen gain

UndstG2=Chosen gain r=Measured yaw rate and rdem as shown is calculated as follows:

$$rdem = \beta f*Ky1$$

where rdem=Demanded yaw rate

Ky1=Chosen gain

βf=Measured front wheel steer angle

A "transient demand" Ky22 is also calculated using variables that are zero in steady state conditions, ie. the product of steered angle speed and also yaw acceleration.

$$Ky22 = TranG1*D\beta f + TranG2*DR$$

where

TranG1=Chosen gain

Dβf=dβf/dt=Steered angle speed

TranG2=Chosen gain

Dr=dr/dt=Yaw acceleration

Each one of the demands Ky21 and KY22 are multiplied and added together to calculate the limit handling demand KyL as follows:

$$KyL = KTrig1*Ky21 + Ktrig2*Ky22 \quad (A)$$

where

KTrig1=Chosen gain

KTrig2=Chosen gain

Alternatively, Ky21 can be calculated from measured lateral acceleration ny as follows:

$$Ky21 = UndstG1*rdem + UndstG2*ny$$

where ny=Lateral accleration

In the preferred embodiment some damping is incorporated in the limit handling demand by using a differentiated value of lateral acceleration as follows:

$$KyL_1 = KyL + KDny + Dny$$

where

Dny=Lateral acceleration

K=Chosen gain

KyL=Limit handling demand as calculated in equation A

KyL$_2$=modified limit handling demand

The limit handling demand (KyL or KyL$_1$) is averaged with previous value:

$$KyLnew = (KyL + KyL\ previous)$$

The final calculated demand is finally low pass filtered to and becomes the low pass filtered limit handling demand KyLf. The value of the filter constant in the low pass filter is not crucial, but limiting the frequency of the limit handling demand to frequencies below 5 Hz is preferred. The detection means 51 detemines whether:

$$Abs\ (KyLf) > TrigL \quad (B)$$

where

ABs(x)=Absolute value of x

KyLf=Filtered limit handling demand

TrigL=Chosen threshold

When the fourth test is used then the controller only recognises oversteer slide conditions when the limit handling demand is above the given value TrigL. TrigL can be determined by experimentation.

It has been found that the three earlier mentioned tests give good control if used by themselves and the fourth test is not strictly necessary. However, the fourth test can be used in addition to the above three tests in a control system, with KyG2 being switched only when all four tests are satisfied.

The invention lies in the realisation that it is beneficial to alter the operation of a control system for steering the rear wheels of a vehicle when the vehicle is sliding and providing means to detect the slide.

The invention lies in the modification of a rear wheel steer system during oversteer conditions rather than in the provision of a rear wheel steer system in itself.

I claim:

1. A steering system for steering the rear wheels of a vehicle having rear wheels with a controllable variable steering angle comprising:

an actuator for steering the rear wheels;

sensor means for measuring vehicle parameters and generating signals indicative thereof, the sensor means including a sensor which measures displacement of a manually operable steering element of the vehicle, a sensor which measures vehicle speed, a lateral accelerometer, and a yaw rate gyrometer which measures yaw rate of the vehicle; and a control unit for controlling the actuator to steer the rear wheels comprising a processor which processes the signals generated by the sensor means and controls the steering angle of the controllable variable rear wheels accordingly, the processor determining a desired yaw rate as a function of the measured steering element displacement and the measured vehicle velocity, wherein the control unit further comprises detection means to detect when the signals generated by sensor means indicate that the vehicle is sliding, override means which modifies the operation of the control system when sliding is detected, a closed yaw rate error control loop feedback means for controlling the steer angle of the rear wheels having means for generating an error signal from a difference between the measured yaw rate and the determined desired yaw rate, and means for multiplying the error signal by a variable gain to generate a signal for controlling the controllable variable steering angle of the rear wheels, and wherein the detection means detects sliding by determining whether the lateral acceleration measured by the lateral accelerometer and the measured steering element displacement are of opposite sense, the detection means combines the signals indicative of yaw rate, steering angle and lateral acceleration according to a preprogrammed algorithm, to generate a control variable which is compared with a preprogrammed value, the override means only altering the variable gain of the control system when the detection means detects that the control variable exceeds the preprogrammed value, and the override means alters the variable gain in the yaw rate error control loop when sliding is detected.

2. A steering system as claimed in claim 1 wherein the override means reduces the variable gain of the yaw error control loop when sliding is detected.

3. A steering system as claimed in claim 1 wherein the detection means compares the measured velocity with a preprogrammed velocity threshold, the override means only modifies the operation of the control system when the detection means detects that the measured velocity exceeds the velocity threshold.

4. A steering system as claimed in claim 1 wherein the detection means compares the measured lateral acceleration with a preprogrammed lateral acceleration threshold, the override means only altering the variable gain of the control system when the detection means detects that the measured lateral acceleration exceeds the lateral acceleration threshold.

5. A steering system as claimed in claim 4 wherein the detection means includes a low pass filter by which the measured lateral acceleration signal is filtered and the filtered lateral acceleration signal is compared with the lateral acceleration threshold.

6. A steering system as claimed in claim 1 wherein the override means reduces the variable gain of the control system from a first level to a second lower level when the detection means detects sliding and increases the gain from the second lower level to the first level when the detection means detects that the sliding of the vehicle has stopped, the override means ramping the gain between the first and second levels at preprogrammed rates.

7. A steering system as claimed in claim 6 wherein the rate at which the override means ramps the gain from the first level to the second lower level is faster than the rate at which the override means ramps the gain from the second lower level to the first level.

8. A steering system as claimed in claim 7 wherein the override means compares the measured lateral acceleration with a preprogrammed lateral acceleration threshold and wherein the override means increases the rate at which the variable gain of the control system is ramped from the second lower level to the first level when the measured lateral acceleration is less than the preprogrammed lateral acceleration threshold.

9. A steering system as claimed in claim 1 wherein the override means introduces a phase lead in the closed yaw rate error control loop when the detection means detects sliding.

10. A steering system as claimed in claim 1 wherein the override means introduces a phase lag in the closed yaw rate error control loop when the detection means detects sliding.

* * * * *